United States Patent [19]
Routh et al.

[11] Patent Number: 5,287,753
[45] Date of Patent: Feb. 22, 1994

[54] CONTINUOUS DISPLAY OF PEAK AND MEAN BLOOD FLOW VELOCITIES

[75] Inventors: Helen F. Routh, Kirkland; Charles W. Powrie, Jr., Bellevue; Roy B. Peterson, Redmond, all of Wash.

[73] Assignee: Advanced Technology Laboratories, Inc., Bothell, Wash.

[21] Appl. No.: 892,301

[22] Filed: May 2, 1992

[51] Int. Cl.$^5$ ................................................ G01F 1/00
[52] U.S. Cl. .............................. 73/861.25; 128/661.08
[58] Field of Search ..................... 73/861.25, 170.13; 128/660.05, 661.07, 661.08, 660.06

[56] References Cited

U.S. PATENT DOCUMENTS 4,848,354  7/1989  Augelsen et al. ................. 73/861.25
5,065,764 11/1991  Nakamura et al. ............... 73/861.25

OTHER PUBLICATIONS

Doppler Ultrasound by D. H. Evans et al., publ. by John Wiley & Sons, (1989) at pp. 166-184 and 266-269.
"Performance of The Mean Frequency Doppler Mudulator", by R. W. Gill, publ. in *Ultrasound in Med. & Biol.*, vol. 5 at pp. 237-247 (1979).
"Power-Spectrum Centriod Detection For Doppler Systems Applications" by L. Gerzberg and J. D. Meindl, publ. in *Ultrasonic Imaging*, vol. 2 at pp. 232-261 (1980).
"Comparison Of Four Digital Maximum Frequency Estimators For Doppler Ultrasound" by L. Y. L. Mo et al. publ. in *Ultrasound in Med & Biol.*, vol. 14, No. 5 at pp. 355-363 (1988).
"The Square Foot of Frequency Power-Spectrum Centroid Detector: System Considerations, Implementation, And Performance" by L. Gerzberg & J. D. Meindl, pub. in Ultrasonic Imaging, vol. 2 at pp. 262-289 (1980).
Mo, Larry Y. L., L. Yun, and R. Cobbold, Comparison of four digital maximum frequency estimators for Doppler ultrasound; Ultrasound in Med. & Biol., 14, 335-363, 1988.

*Primary Examiner*—Herbert Goldstein
*Assistant Examiner*—R. Biegel
*Attorney, Agent, or Firm*—W. Brinton Yorks, Jr.

[57] ABSTRACT

A technique for continuously determining and displaying the peak and mean velocities of spectral Doppler information is disclosed. Received spectral Doppler data is examined over a predetermined period to determine the signal to noise ratio of the Doppler signals. Individual instantaneous measurements, or lines, of Doppler spectral information are analyzed in the power versus frequency domain to compare the line information against a noise threshold determined by the signal to noise ratio. The maximum frequency signal component is thereby identified as the peak velocity of the spectral line. Mean velocity is calculated as an intensity weighted mean about the maximum power frequency of the line data. The identified peak and mean velocities are displayed in contrasting colors or shades on a continuously updated and displayed flow velocity versus time spectral display.

13 Claims, 3 Drawing Sheets

CONTINUOUS DISPLAY OF PEAK AND MEAN BLOOD FLOW VELOCITIES

This invention relates to ultrasonic diagnostic systems which measure the velocity of blood flow using spectral Doppler techniques and, in particular, to the continuous display of such information including peak and mean blood flow velocities.

Ultrasonic diagnostic imaging systems are in widespread use for performing ultrasonic imaging and measurements through the use of scanheads which are placed against the skin. Such systems are in common use by radiologists, cardiologists, and obstetricians for examinations of the heart, a developing fetus, or internal abdominal organs. These systems operate by actuating an acoustic transducer within the scanhead to transmit ultrasonic energy through the skin and into the body and receiving ultrasonic echoes returned from the internal structure of the body. The transducer converts the acoustic energy of the returning ultrasonic echoes into electrical signals which are coupled by a cable to the diagnostic system for processing and display.

In the measurement of blood flow characteristics, waves of returning ultrasonic signals are compared to a phase reference to determine the phase shift of the returning waves. As the transmitted ultrasonic wave impinges upon flowing material such as blood cells, the movement of the flowing material will impart a Doppler shift to the returning echo signal. This phase shift, which is commonly measured in kilohertz, translates into the rate of movement or velocity of the blood flow. This Doppler velocity information is conventionally displayed as a continuous spectrum of lines of varying amplitudes in a moving or scrolled display on a video monitor. Each line represents an instantaneous measurement of blood flow. For arterial flow, the spectrum of lines will rise during the systolic phase of the heart cycle and decline to lower levels during the diastolic phase of the heart cycle. As the flow of blood in a vessel or the heart is continuously monitored and interrogated by Doppler ultrasound, the spectrum of systolic and diastolic velocities is continuously displayed and passed before the clinician.

In order to analyze the various disease states of the cardiovascular system it is desirable to calculate a number of parameters from the spectral velocity information. These parameters include peak systolic velocity, minimum diastolic velocity, the systolic/diastolic ratio, the pulsatility index, the velocity time integral, and the time averaged mean velocity. Many of these parameters are predicated upon identifying peak and mean velocities of blood flow. The conventional technique for determining the peak and mean velocities and related parameters is to save a recording of a period of spectral information over several consecutive heart cycles. With the spectral display held motionless on the screen the clinician manually traces the peaks of the spectral display with a cursor. Calculation software may then use the spectral tracing to calculate mean velocities and a variety of other parameters.

This technique has several obvious disadvantages including the need to do a tedious, time consuming tracing and the inaccuracies inherent in a manually executed procedure. Moreover, this technique does not lend itself to automated processing, as the calculation software is dependent upon this manual exercise of display tracing. Furthermore, the ultrasonic examination of a patient must be interrupted by stopping the acquisition of Doppler information in order to perform the manual tracing of previously acquired data. It would be preferable to be able to automatically acquire the peak and mean velocity data without the need for manual intervention or interruption of a patient examination.

A number of problems confront any attempt to automatically analyze Doppler spectral data, however. Any such technique must account for and respond appropriately to faulty spectral information or loss of Doppler signals which may occur when a patient moves or the clinician moves the scanhead, for instance. Also, the technique must be able to reliably distinguish between Doppler signal information and noise so that the peaks of weak signals are accurately determined in the presence of background noise.

In accordance with the principles of the present invention a technique for continuously determining and displaying the peak and mean velocities of spectral Doppler information is disclosed. Received spectral Doppler data is examined over a predetermined period to determine a noise threshold level. Individual instantaneous measurements, or lines, of Doppler spectral information are analyzed to compare the line information against the noise threshold. The correlation of the threshold and the spectral line information identifies the peak velocity of the spectral line. Mean velocity is calculated as an intensity weighted mean of the spectral line information. The identified peak and mean velocities are displayed in contrasting colors or shades on a continuously updated and displayed frequency versus time spectral display.

Figure 1:
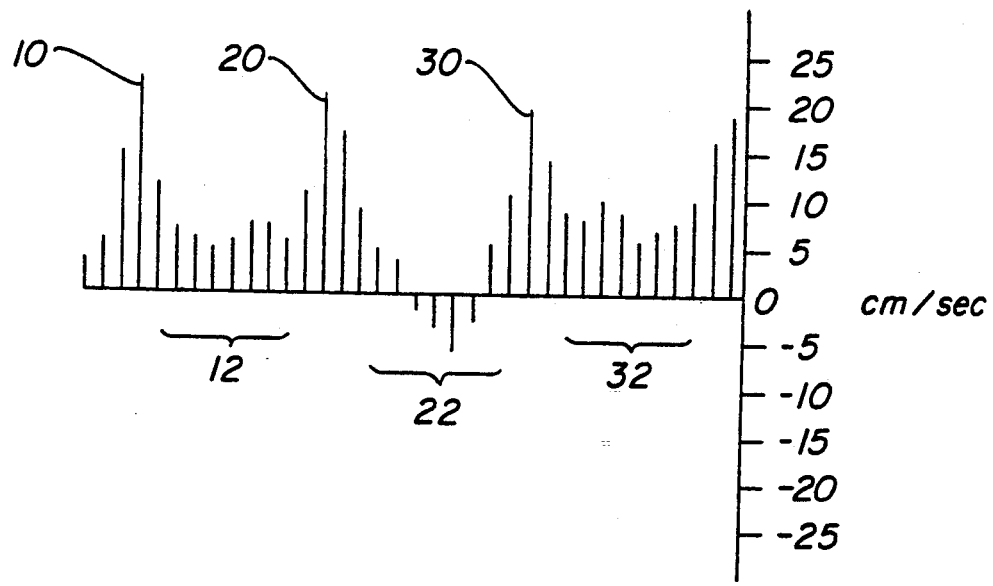
FIG. 1 illustrates a scrolling Doppler spectral display as produced by ultrasound systems of the prior art.

Referring first to FIG. 1, a scrolling Doppler spectral display which is produced by ultrasound systems of the prior art is shown. The illustrated display is developed by repetitively transmitting ultrasonic Doppler waves to a selected site, such as the heart or a blood vessel, inside the body. Echo signals are returned by moving blood cells in the heart or vessel and received by a piezoelectric transducer which converts the ultrasonic echoes into electrical signals. The signals are amplified and phase detected to determine their frequency shift characteristics. Samples of the detected signals are processed in a Doppler processor to determine the power (intensity) versus frequency characteristics of the signals. The spectral frequency characteristics are translated to velocity equivalents, and the Doppler information of discrete sampling periods is displayed as a sequence of continuous scrolling spectral lines in a real-time time versus velocity display as shown in FIG. 1. In the display of FIG. 1, newly generated spectral lines are produced at the right side of the display. The sequence of lines moves or scrolls from right to left, with previously generated spectral data on the left and progressively more current data to the right. Each line conveys the range of flow velocities detected in the blood flow at a particular time of Doppler interrogation. The highest velocities shown by lines 10, 20, and 30 would typically occur during the systolic phase of the heart cycle. The intervals 12, 22, and 32 between the systolic phases represent flow velocity during the intervening diastolic phases of heart action.

In a typical diagnostic procedure of the prior art the clinician manipulates the ultrasonic scanhead and steers the ultrasonic beam toward the vessel or organ where flow velocity information is desired. The spectral display is monitored as its scrolls by until the clinician is satisfied that it has become stable. The spectral display is then frozen on the screen and saved for analysis. The analysis may proceed by stopping the scanning of the patient and manually tracing the spectral peaks with a cursor controlled by a joystick or trackball on the ultrasound system. Calculation software in the system can then operate on the tracing to determine clinical flow parameters such as peak systolic velocity, minimum diastolic velocity, the systolic/diastolic ratio, the pulsatility index and the velocity time integral. The time averaged mean velocity can then be estimated by operating on the peak velocity tracing data in concert with assumptions made as to certain flow characteristics. Alternatively the saved spectral information can be applied to an offline processor which is capable of operating on the spectral information to determine desired clinical parameters. In either case, patient scanning is interrupted and time consuming operations must be performed to derive the desired diagnostic information.

The display of FIG. 1 may be produced by using the spectral Doppler acquisition and display capabilities of a number of commercially available ultrasound systems such as the Ultramark(R) 9 diagnostic ultrasound system manufactured by Advanced Technology Laboratories, Inc. of Bothell, Wash.

Figure 2:
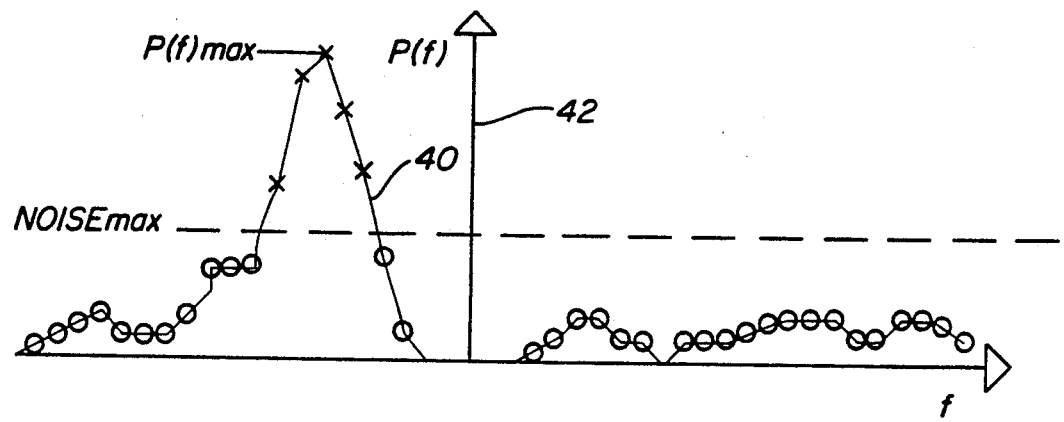
FIG. 2 illustrates a power versus frequency plot of the data points of a typical Doppler spectral measurement.

FIG. 2 illustrates a typical intensity versus frequency plot of Doppler data produced by the ultrasound system's Doppler processor from signals acquired during a particular time of Doppler interrogation of the flow of the vessel or organ being examined. In a digital signal processing system such as the Ultramark 9 the Doppler data is a series of discrete digital values as denoted by the circles and X's of FIG. 2. For ease of illustration a curve 40 in FIG. 2 has been drawn to connect the digital values. The curve 40 and its digital values will range about a vertical axis 42, extending over a range of frequency values in the horizontal direction. The vertical axis 42 marks a frequency value of zero on the horizontal frequency axis. The frequency limits vary with the system setting for the range of velocities to be detected. Exemplary limits might be +1000 Hz and −1000 Hz, which correspond to flow velocities of +30 cm/sec and −30 cm/sec, respectively. In the vertical intensity direction the point $P(f)_{max}$ denotes the maximum power or intensity of the received signals at its corresponding frequency on the horizontal frequency axis. The frequency of peak power is not the peak signal frequency, however, which it is the objective of the present invention to identify.

To positively identify the peak signal frequency, valid Doppler signals must be distinguished from noise. Without a viable noise immunity technique, a peak signal tracing technique can erroneously identify noise peaks as signal peaks. Thus, in accordance with the principles of the present invention, a signal to noise threshold for the received signals is first determined. Signal to noise determination begins by selecting a number of spectral lines during a heart cycle for analysis. While FIG. 1 shows approximately ten spectral lines during one heart cycle, such as the ten lines between systolic peaks 10 and 20, in practice the number of such lines is generally far greater, ranging up to fifty or more. The number of lines is a function of several factors such as the PRF (pulse repetition frequency) of Doppler interrogation, signal averaging, and display scroll rate. From the total number of lines occurring during the heart cycle only every third, or every sixth, or every seventh line may be selected for analysis. Alternatively, lines may be selected over some predetermined period, such as every fourth line occurring over a period of one second. Depending upon the selection methodology chosen, a number of lines such as sixteen or thirty-two may be selected during the chosen interval.

For each of these spectral lines, each having a unique data set represented by the one of FIG. 2, the peak intensity $P(f)_{max}$ is found. Then an assumed noise threshold is applied to each data set as indicated by the threshold $NOISE_{max}$ in FIG. 2. This assumed threshold could be 3 dB below the peak intensity $P(f)_{max}$, for instance. Then all data points above and below the $NOISE_{max}$ threshold are respectively averaged for each line. In the example of FIG. 2, the values of the X data points are averaged to determine an average signal value for the spectral line and the values of the O data points are averaged to determine an average noise value for the spectral line. In the determination of the average noise value, values of zero may be ignored such as those which would occur on either side of the origin in FIG. 2. Next, the average signal values of all of the lines are averaged to determine an average signal value for the selection period and the average noise values of all of the lines are averaged to determine an average noise value for the selection period. From these selection period average values a signal to noise ratio SNR is calculated as $$SNR = \frac{\text{Average Signal}_{pd}}{K * \text{Average Noise}_{pd}}$$

where the constant k is a function of the scroll rate, or display rate, of the spectral lines. The calculated value of SNR is in units of dB [down from the signal intensity peak].

Thus, at approximately the end of a first heart cycle of spectral lines, a signal to noise value has been determined. This SNR value is used as explained below to identify the peak velocity of each spectral line during the succeeding heart cycle. Concurrently a new SNR value is calculated in the foregoing manner during this second heart cycle for use in identifying peak velocities during the third heart cycle.

Figure 3:
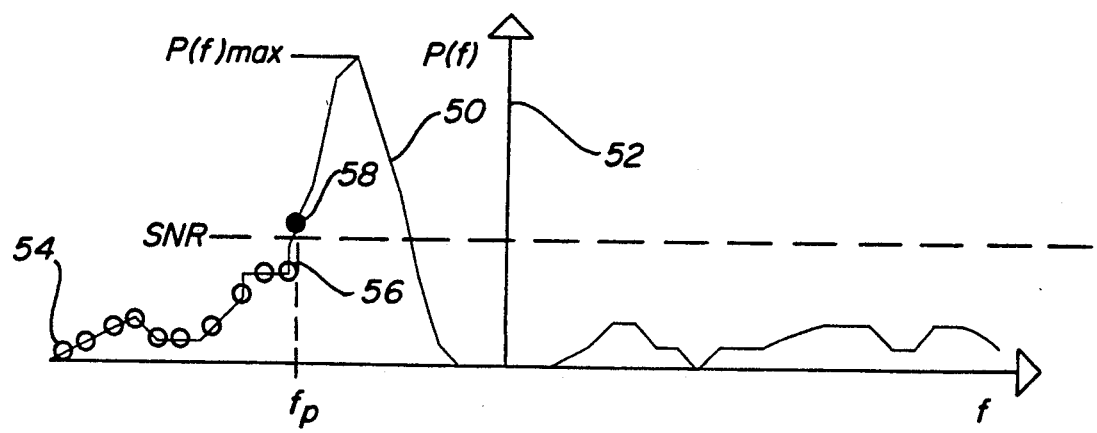
FIG. 3 illustrates the identification of the peak velocity of a spectral line in accordance with the principles of the present invention.

During the second heart cycle each spectral line is analyzed and its peak velocity value identified as illustrated with reference to FIG. 3. This FIGURE shows a curve 50 which connects the discrete digital values of a spectral line, some of which are indicated by the circles on the left side of the curve. The first step in peak velocity identification is to find the peak intensity $P(f)_{max}$ of each successive spectral line and analyze the $P(f)_{max}$ value to determine whether the spectral line is a valid one. This analysis provides the peak signal determination with a degree of noise immunity.

The $P(f)_{max}$ value is first compared to the value of the average noise of the previous heart cycle, Average Noise$_{pd}$. If the value of $P(f)_{max}$ is less than the value of the average noise, no peak determination is made for this spectral line; the line is ignored and the analysis proceeds to the next spectral line. If five successive spectral lines are analyzed in this manner and fail the comparison, the value of Average Noise$_{pd}$ is decremented by a predetermined amount and the analysis continues using the decremented value of Average Noise$_{pd}$. If no valid comparison is found and the value of Average Noise$_{pd}$ is decremented below a predefined lower limit, the system concludes that only noise is being received; no peak velocity determinations are made until the level is exceeded. Such a condition could arise if the scanhead was removed from the patient, for instance, or if the Doppler beam is not being directed to a region of the body where flow is occurring.

If the $P(f)_{max}$ value meets the average noise comparative test, the $P(f)_{max}$ value is then analyzed to see if it falls within a range of possible values. If $P(f)_{max}$ is below the range the spectral line is probably noise induced and is discarded. If $P(f)_{max}$ is within the range the signal is probably bordering on noise and cannot reliably be identified as valid spectral data; if this occurs the previously identified peak value of the previous spectral line is held over and analysis proceeds to the next spectral line. If the $P(f)_{max}$ value is above the range the signal is strong enough to be regarded as valid data for the performance of a new peak velocity determination. The preferred end limits for the range are functionally of the form $K_L*$Average Noise$_{pd}$ and $K_H*$Average Signal$_{pd}$, representing the lower and higher range limits, respectively.

Once the $P(f)_{max}$ value of a particular spectral line satisfies the foregoing noise analysis and the line has therefore been found to exhibit the desired immunity to noise and spurious effects, the value of $P(f)_{max}$ is examined to see which side of the vertical baseline 52 the value is located. This determines the direction of the flow in relation to the position of the scanhead, and also the end of the spectrum from which the search for the peak velocity is to proceed. In the exemplary spectral line of FIG. 3, the $P(f)_{max}$ value is located to the left of the baseline 52, indicating flow toward (or away from, depending upon the chosen convention) the scanhead. The search for the peak velocity value therefore begins from the leftmost digital value, which is circle 54.

Figure 4:
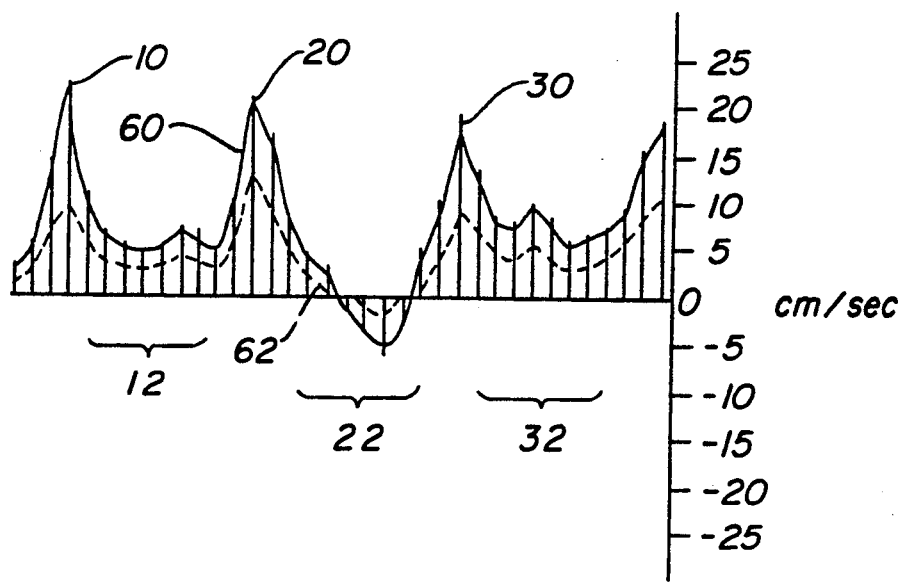
FIG. 4 illustrates a continuous display of spectral Doppler peak and mean velocities in accordance with the principles of the present invention.

The search for the peak velocity value proceeds from value 54 and continues to the right in the drawing, through value 56 and then to the value indicated by the solid circle 58. Between values 56 and 58 the SNR threshold is traversed. The system will choose the value closest to the SNR threshold as the peak velocity value, which in the example shown is digital value 58. This value has a frequency of $f_p$ as shown in the drawing, which is substantially the highest frequency of the values which are above the SNR threshold. The velocity corresponding to $f_p$ is thus identified as the peak velocity for this spectral line, and that velocity is graphically marked in the spectral line display. FIG. 4 illustrates a spectral line display in which the peak velocity of each spectral line has been identified in this manner and the peaks connected by the solid display line 60. As FIG. 4 shows, the spectral line peak velocities can be identified and displayed as the spectral lines occur and are displayed, thereby providing a realtime continuous display of peak spectral velocities.

For each displayed spectral line which satisfies the noise immunity tests a mean velocity value is calculated and displayed. A variety of techniques are known for calculating mean velocity, a preferred one being an intensity weighted mean of the spectral P(f) digital values. This calculation is of the form $$\text{Mean Velocity} = \frac{\Sigma K_m * P(f)}{\Sigma P(f)}$$

where $K_m$ is a function of the location of $P(f)_{max}$ on the frequency axis. A correction is then made for the effects of noise, which may be any of a variety of accepted correction techniques such as those described in the paper by R. W. Gill entitled "Performance of The Mean Frequency Doppler Modulator", published in *Ultrasound in Med. & Biol.*, Vol 5, pp. 237–47 (1979). The mean velocity thereby determined is marked on the spectral line display, also concurrently with the initial appearance of the spectral line at the right-hand side of the spectral line display. FIG. 4 shows a dashed line display which connects the calculated mean velocity values of the displayed spectral lines.

Figure 5:
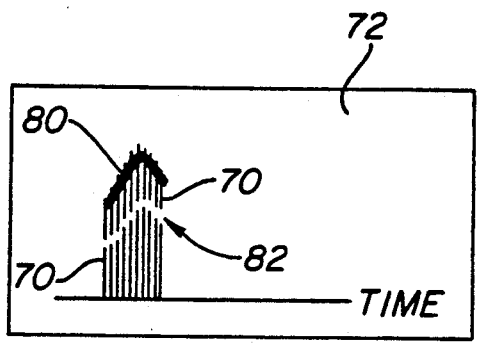
FIG. 5 illustrates a preferred monochrome display of continuous peak and mean velocity information.

Several preferred techniques may be employed for displaying the spectral lines with the peak and mean velocity determinations. For a color display the peak velocity line 60 and the mean velocity line 62 are displayed in colors or shades which contrast with the spectral lines and with each other. One of the peak or mean velocity lines may be emphasized over the other, the preferred technique being to more brightly display the peak velocity line 60 as compared to the mean velocity line 62, as by using a greater pixel line width. FIG. 5 illustrates a preferred technique for a monochrome display. (NOTE: In FIG. 5 the shadings are reversed from what is described.) In this FIGURE the spectral lines 70 are displayed in shades of grey against a black background 72. The peak velocity line 80 is brightly displayed in white and the mean velocity values are marked by blanking their positions on the respective spectral lines, thereby effectively leaving a black line running through the the spectral lines 70 as indicated at 82. This technique takes advantage of rapid, high density production and display of spectral lines, in which the spectral lines 70 are displayed virtually adjacent to each other, thereby resembling a continuous band of grey shading below the peak velocity line 80. The black mean velocity line 82 is thus distinctly displayed in contrast to the surrounding grey shading of the spectral lines.

A number of additional techniques may be employed to insure greater integrity for the displayed Doppler velocity information and noise immunity. For instance, if spectral lines are acquired at a rate in excess of the display scroll rate, a number of acquired lines may be averaged and the average of several signal acquisitions displayed as one spectral line. The number of excessive changes in $P(f)_{max}$ values within a given time interval can be monitored. The occurrence of a number of excessive peak changes within a given interval indicates that random noise signals are being processed, prompting the system to stop the display of peak and mean velocities until valid spectral line data is identified. The identified peak and/or mean velocity values of a number of successive spectral lines can be examined and the average or median value displayed to further diminish noise and other random effects. These further enhancements will increase the value of the displayed information to the diagnosing clinician.

Since the technique of the present invention presents continuous realtime peak and mean velocity information while the clinician is scanning the patient, a variety of clinical parameters which require peak or mean velocity information for their determination can be concurrently calculated and numerically displayed for the clinician. These include peak systolic velocity, end diastolic velocity, minimum diastolic velocity, time averaged peak velocity, systolic/diastolic ratio, pulsatility index, velocity time integral, resistance index, pressure half time, acceleration time, deceleration time, heart cycle length, and time averaged mean velocity. A listing of such conventional parameters is given in the text *Doppler Ultrasound* by D. H. Evans et al., pub. by John Wiley & Sons (1989) at pages 166-84 and 266-69. With this further capability a diagnostic examination of cardiovascular performance can be performed reliably and efficiently to the benefit of both patient and clinician.

What is claimed is:

1. Ultrasonic diagnostic apparatus for providing Doppler information concerning flow velocities comprising:
   means for acquiring Doppler signals from a region of a body;
   means for processing said Doppler signals to produce spectral line data representing frequency or velocity for continuous display of a succession of spectral lines during the continuation of Doppler signal acquisition;
   means for analyzing the data of a plurality of said spectral lines to determine a threshold level;
   means for utilizing said threshold level and said spectral line data of a first successive spectral line to identify a peak velocity value in said first successive spectral line prior to the display of said first successive spectral line; and
   means for displaying said first successive spectral line and its identified peak velocity value prior to the display of a second successive spectral line.

2. The ultrasonic diagnostic apparatus of claim 1, further comprising:
   means for utilizing said spectral line data of said first successive spectral line to identify a mean velocity value in said first successive spectral line prior to the display of said first successive spectral line; and
   means for displaying said first successive spectral line and its identified mean velocity value prior to the display of a second successive spectral line.

3. The ultrasonic diagnostic apparatus of claim 2, wherein said means for utilizing said spectral line data of said first successive spectral line to identify a mean velocity value comprises means for calculating an intensity weighted means utilizing said spectral line data of said first successive spectral line.

4. The ultrasonic diagnostic apparatus of claim 2, wherein said means for displaying comprise means for displaying said spectral lines in a first color or tone, said identified peak velocity values in a color or tone which is distinguished from said first color or tone, and said identified mean velocity values in a color or tone which is distinguished from that of said spectral lines and said peak velocity values.

5. The ultrasonic diagnostic apparatus of claim 4, wherein said means for displaying comprise means for displaying said spectral lines in shades of grey against a black background, said identified peak velocity values brighter than said shades of grey, and said mean velocity values in said background color.

6. The ultrasonic diagnostic apparatus of claim 1, wherein said means for displaying comprise means for displaying a line connecting successive identified peak velocity values.

7. Ultrasonic diagnostic apparatus for providing Doppler information concerning flow velocities comprising:
   means for acquiring Doppler signals from a region of a body;
   means for processing said Doppler signals to produce spectral line data representing frequency or velocity for continuous display of a succession of spectral lines during the continuation of Doppler signal acquisition;
   means for analyzing the data of a plurality of said spectral lines to determine a threshold level;
   means for utilizing said threshold level and said spectral line data of a first successive spectral line to identify a peak velocity value in said first successive spectral line prior to the display of said first successive spectral line; and
   means for displaying said first successive spectral line and its identified peak velocity value prior to the display of a second successive spectral line,
   wherein said means for analyzing the data of a plurality of said spectral lines comprises means for determining a noise threshold level.

8. The ultrasonic diagnostic apparatus of claim 7, wherein said means for analyzing comprises means for analyzing the data of a plurality of said spectral lines occurring during a first time interval to determine a threshold level; and wherein said first successive spectral line comprises one of a sequence of spectral lines occurring during a second, contiguous time interval.

9. The ultrasonic diagnostic apparatus of claim 7, wherein said means for displaying comprise means for displaying a line connecting successive identified peak velocity values.

10. The ultrasonic diagnostic apparatus of claim 7, further comprising:
    means for utilizing said spectral line data of said first successive spectral line to identify a mean velocity value in said first successive spectral line prior to the display of said first successive spectral line; and
    means for displaying said first successive spectral line and its identified mean velocity value prior to the display of a second successive spectral line.

11. The ultrasonic diagnostic apparatus of claim 7, wherein said means for displaying comprise means for displaying said spectral lines in a first color or tone, said identified peak velocity values in a color or tone which is distinguished from said first color or tone, and said identified mean velocity values in a color or tone which is distinguished from that of said spectral lines and said peak velocity values.

12. The ultrasonic diagnostic apparatus of claim 11, wherein said means for displaying comprise means for displaying said spectral lines in shades of grey against a black background, said identified peak velocity values brighter than said shades of grey, and said mean velocity values in said background color.

13. Ultrasonic diagnostic apparatus for providing Doppler information concerning flow velocities comprising:
    means for acquiring Doppler signals from a region of a body;

means for processing said Doppler signals to produce spectral line data representing frequency or velocity for continuous display of a succession of spectral lines during the continuation of Doppler signal acquisition;

means for analyzing the data of a plurality of said spectral lines to determine a threshold level;

means for utilizing said threshold level and said spectral line data of a first successive spectral line to identify a peak velocity value in said first successive spectral line prior to the display of said first successive spectral line; and means for displaying said first successive spectral line and its identified peak velocity value prior to the display of a second successive spectral line, wherein said means for utilizing comprises means for identifying a velocity data value which is in the vicinity of the highest velocity intersection of said spectral line data and said threshold level.

* * * * *